(12) United States Patent
Song et al.

(10) Patent No.: US 12,379,825 B2
(45) Date of Patent: Aug. 5, 2025

(54) MEDIA CONTENT PUBLISHING METHOD, ELECTRONIC DEVICE AND COMPUTER-READABLE STORAGE MEDIUM

(71) Applicant: Beijing Zitiao Network Technology Co., Ltd., Beijing (CN)

(72) Inventors: Qing Song, Beijing (CN); Wanli Che, Beijing (CN); Zeqian Zhang, Beijing (CN); Chen Zhao, Beijing (CN); Mengrong Xu, Beijing (CN)

(73) Assignee: BEIJING ZITIAO NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 18/759,694

(22) Filed: Jun. 28, 2024

(65) Prior Publication Data

US 2024/0353975 A1    Oct. 24, 2024

Related U.S. Application Data

(63) Continuation of application No. PCT/CN2023/086634, filed on Apr. 6, 2023.

(30) Foreign Application Priority Data

Apr. 24, 2022    (CN) .......................... 202210435682.3

(51) Int. Cl.
*G06F 3/0482*    (2013.01)
*G06F 40/166*    (2020.01)
*G11B 27/031*    (2006.01)

(52) U.S. Cl.
CPC .......... *G06F 3/0482* (2013.01); *G11B 27/031* (2013.01); *G06F 40/166* (2020.01)

(58) Field of Classification Search
CPC ............................ G06F 3/0482; G11B 27/031
See application file for complete search history.

(56) References Cited

U.S. PATENT DOCUMENTS

2019/0095436 A1*  3/2019  Martinazzi .............. G06T 11/60
2022/0206738 A1*  6/2022  Anvaripour .......... G11B 27/031
(Continued)

FOREIGN PATENT DOCUMENTS

CN    104113572 A    10/2014
CN    106066757 A    11/2016
(Continued)

OTHER PUBLICATIONS

International Search Report and Written Opinion for PCT/CN2023/086634, mailed Jun. 20, 2023, 14 pages.
(Continued)

*Primary Examiner* — Asher D Kells
(74) *Attorney, Agent, or Firm* — Astute IP Law Group

(57) ABSTRACT

A method for publishing media content, a device and a storage medium are provided. The method for publishing media content includes: in response to a publish page display operation acting on a capture page, switching a current display page from the capture page to a publish page, the publish page being configured to trigger an addition of a target material; and in response to a media content publishing operation, publishing target media content generated based on the target material.

18 Claims, 5 Drawing Sheets

(56) References Cited

U.S. PATENT DOCUMENTS

2022/0208230 A1* 6/2022 Spreitzer .............. G11B 27/034
2024/0233768 A1* 7/2024 Braunstein ............ G06F 3/0485

FOREIGN PATENT DOCUMENTS

| CN | 110494833 A | 11/2019 |
| CN | 110825912 A | 2/2020 |
| CN | 112153288 A | 12/2020 |
| CN | 112911379 A | 6/2021 |
| CN | 113055709 A | 6/2021 |
| CN | 113111195 A | 7/2021 |
| CN | 113395588 A | 9/2021 |
| CN | 113411490 A | 9/2021 |
| CN | 114363686 A | 4/2022 |
| CN | 114610189 A | 6/2022 |
| CN | 114817631 A | 7/2022 |

OTHER PUBLICATIONS

"How to switch interfaces_How to play photos and videos on TikTok? (Dry stuff)", retrieved from: https://blog.csdn.net/weixin_39554021/article/details/111704958, Dec. 3, 2020, 10 pages.
Extended European Search Report for European Patent Application No. 23794976.3, mailed on Mar. 3, 2025, 8 pages.
First Office Action for Chinese Patent Application No. 202210435682.3, mailed on Feb. 25, 2025, 20 pages.

* cited by examiner

MEDIA CONTENT PUBLISHING METHOD, ELECTRONIC DEVICE AND COMPUTER-READABLE STORAGE MEDIUM

CROSS-REFERENCE TO RELATED APPLICATIONS

The present disclosure is a continuation of International Patent Application No. PCT/CN2023/086634, filed on Apr. 6, 2023, which claims priority of the Chinese Patent Application No. 202210435682.3, filed with the Chinese Patent Office on Apr. 24, 2022, the entire disclosure of which is incorporated by reference in the present disclosure.

TECHNICAL FIELD

Embodiments of the present disclosure relate to the field of computer technology, and for example, to a method and apparatus for publishing media content, a device, a storage medium and a program product.

BACKGROUND

Currently, when there is a need to publish image-text type media content, the user may first enter a local album from a capture page to select a local picture, and then switch to an editing page to edit the selected picture, and when the editing is completed, enter a copywriting into a publishing page, and publish the image-text type media content generated based on the copywriting and the edited picture.

However, in the related art, the operation of publishing the image-text type media content is cumbersome, resulting in the publication of the image-text type media content taking a long time.

SUMMARY

Embodiments of the present disclosure provide a method and apparatus for publishing media content, a device, a storage medium and a program product to simplify the operations required to publish the image-text type media content.

In a first aspect, an embodiment of the present disclosure provides a method for publishing media content, which includes:
  in response to a publish page display operation acting on a capture page, switching a current display page from the capture page to a publish page, the publish page being configured to trigger an addition of a target material; and
  in response to a media content publishing operation, publishing target media content generated based on the target material.

In a second aspect, an embodiment of the present disclosure further provides an apparatus for publishing media content, which includes:
  a switching module, configured to, in response to a publish page display operation acting on a capture page, switch a current display page from the capture page to a publish page, the publish page being configured to trigger an addition of a target material; and
  a publishing module, configured to, in response to a media content publishing operation, publish target media content generated based on the target material.

In a third aspect, an embodiment of the present disclosure further provides an electronic device, which includes:
  a processor; and
  a memory configured to store programs,
  when the programs are executed by the processor, the processor implementing the method for publishing media content according to the embodiments of the present disclosure.

In a fourth aspect, an embodiment of the present disclosure further provides a computer-readable storage medium storing computer programs, and the computer programs when executed by a processor, implements the method for publishing media content according to the embodiments of the present disclosure.

In a fifth aspect, an embodiment of the present disclosure further provides a computer program product, when the computer program product is executed by a computer, the computer implements the method for publishing media content according to the embodiments of the present disclosure.

BRIEF DESCRIPTION OF DRAWINGS

Throughout the drawings, the same or similar reference numerals refer to the same or similar elements. It should be understood that the drawings are schematic and that originals and elements are not necessarily drawn to scale.

DETAILED DESCRIPTION

Figure 1:
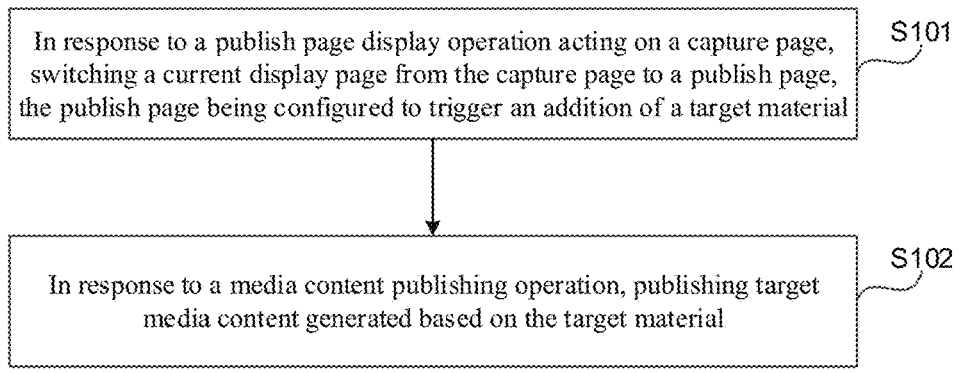
FIG. 1 is a flowchart of a method for publishing media content provided in an embodiment of the present disclosure.

Embodiments of the present disclosure are described in detail below with reference to the drawings. Although some embodiments of the present disclosure are shown in the drawings, it should be understood that the present disclosure may be achieved in a plurality of forms and should not be construed as being limited to the embodiments set forth herein. It should be understood that the drawings and embodiments of the present disclosure are intended to be exemplary only.

It should be understood that a plurality of steps recorded in the implementation modes of the method of the present disclosure may be performed according to different orders and/or performed in parallel. In addition, the implementation modes of the method may include additional steps and/or steps omitted or unshown.

The term "including" and variations thereof used in this article are open-ended inclusion, namely "including but not limited to". The term "based on" refers to "at least partially based on". The term "one embodiment" means "at least one embodiment"; the term "another embodiment" means "at least one other embodiment"; and the term "some embodiments" means "at least some embodiments". Relevant definitions of other terms may be given in the description hereinafter.

It should be noted that concepts such as "first" and "second" mentioned in the present disclosure are only used to distinguish different apparatuses, modules or units, and are not intended to limit orders or interdependence relationships of functions performed by these apparatuses, modules or units.

It should be noted that modifications of "one" and "more" mentioned in the present disclosure are schematic rather than restrictive, and those skilled in the art should understand that unless otherwise stated in the context, it should be understood as "one or more".

Names of messages or information exchanged between a plurality of apparatuses in embodiments of the present disclosure are only used for the purpose of description and not meant to limit the scope of these messages or information.

FIG. 1 is a flowchart of a method for publishing media content provided in an embodiment of the present disclosure. The method may be performed by an apparatus for publishing media content, the apparatus may be implemented by a software and/or hardware, configurable in an electronic device, for example, a mobile phone or a tablet. The method for publishing media content provided by the embodiment of the present disclosure is applicable to a scenario in which the media content is authored and published, for example, to a scenario in which the image-text type media content is authored and published. As shown in FIG. 1, the method for publishing media content provided by the present embodiment may include:

S101, in response to a publish page display operation acting on a capture page, switching a current display page from the capture page to a publish page, the publish page being configured to trigger an addition of a target material.

The publish page display operation may be understood as an operation for instructing to display the publish page, such as an operation of performing a set gesture in the capture page, or an operation of triggering a preset control displayed in the capture page. Taking the example of publishing the image-text type media content, the preset control may be an image-text sending control. The target material may be understood as a material added by the user in the publish page for generating the media content to be published, such as a content material and/or a background musical material added by the user in the publish page. The content material may include a local material of the user and may also include an online material.

Figures 2, 3:
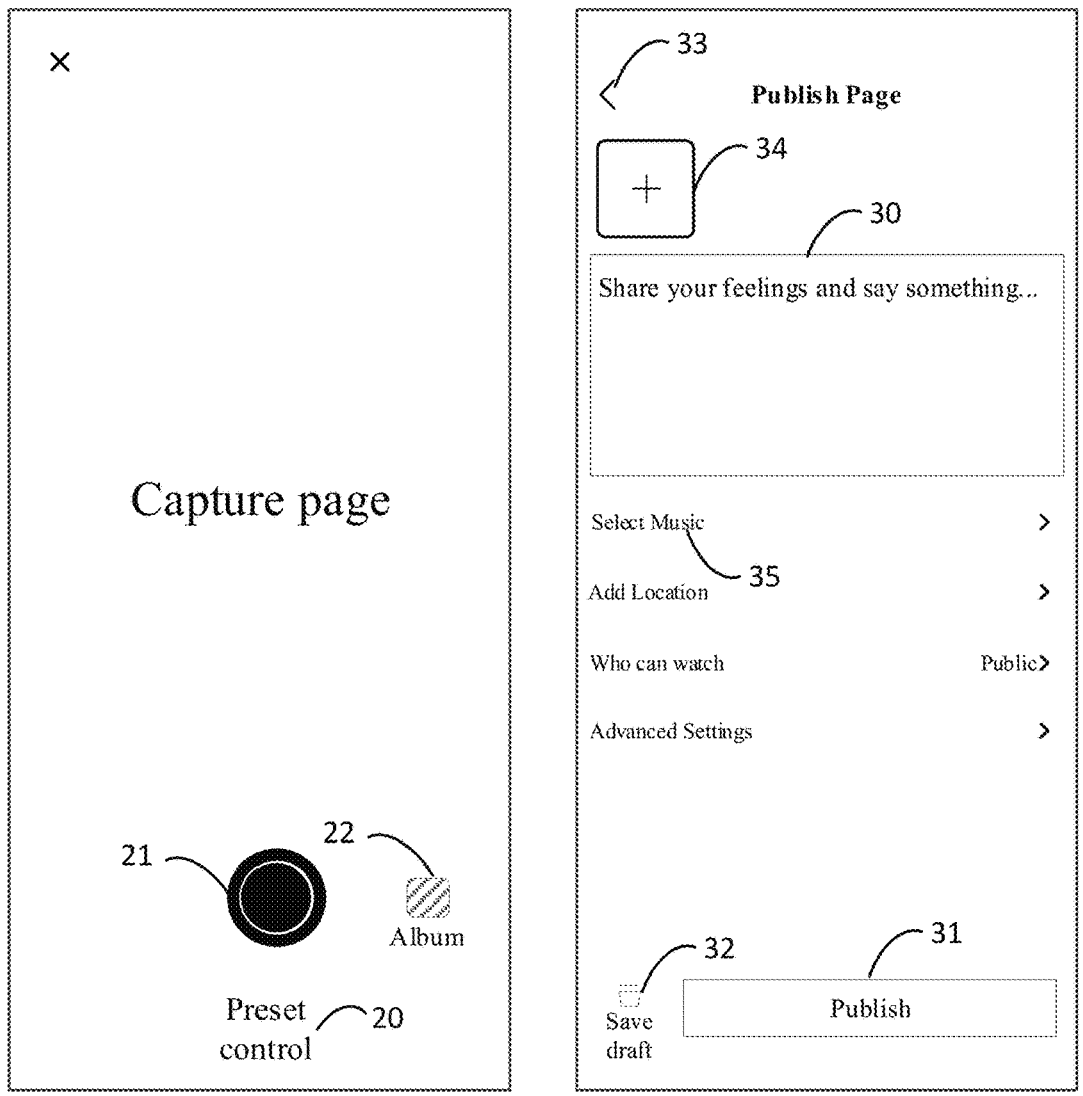
FIG. 2 is a schematic diagram of a display of a capture page provided in an embodiment of the present disclosure.
FIG. 3 is a schematic diagram of a display of a publish page provided in an embodiment of the present disclosure.

Illustratively, as shown in FIG. 2, a preset control 20 may be provided in the capture page. Thus, the user may perform a publish page display operation, such as triggering the preset control 20, when he or she wishes to switch to the publish page. Accordingly, the electronic device may switch the currently displayed page from the capture page to the publish page as shown in FIG. 3 when receiving the publish page display operation of the user, for the user to add the target material in the publish page.

In addition, as shown in FIG. 2, a capture control 21, an album control 22, and/or other controls may also be displayed in the capture page. Thus, the user can capture a picture or video by triggering the capture control 21. Also, the user can switch into the local album by triggering the album control 22 to select a material in the local album, switch to the editing page to edit the selected material when the material selection is completed, and switch to the publish page to input publishing information after the editing is completed, and publish the media content.

In the present embodiment, the currently displayed capture page is directly switched to the publish page based on the publish page display operation of the user, without first switching from the capture page or the local album to the editing page, and then switching from the editing page to the publish page based on the triggering operation of the user, so that the user can publish the media content without entering the editing page when there is no editing need, not only can simplify the operation required for the user to publish the media content, shorten the authoring path of the user, and improve the authoring efficiency of the user, it is also possible to provide a new path to publish the media content, to enrich the way of publishing the media content, and to prompt the user's experience.

S102, in response to a media content publishing operation, publishing target media content generated based on the target material.

A media content publishing operation may be understood as an operation of generating and publishing the media content based on the target material added by the user in the publish page, such as an operation of triggering a publishing control in the publish page. The target media content may be understood as media content generated based on the target material added by the user in the publish page, such as the image-text type media content or video content.

Figure 4:
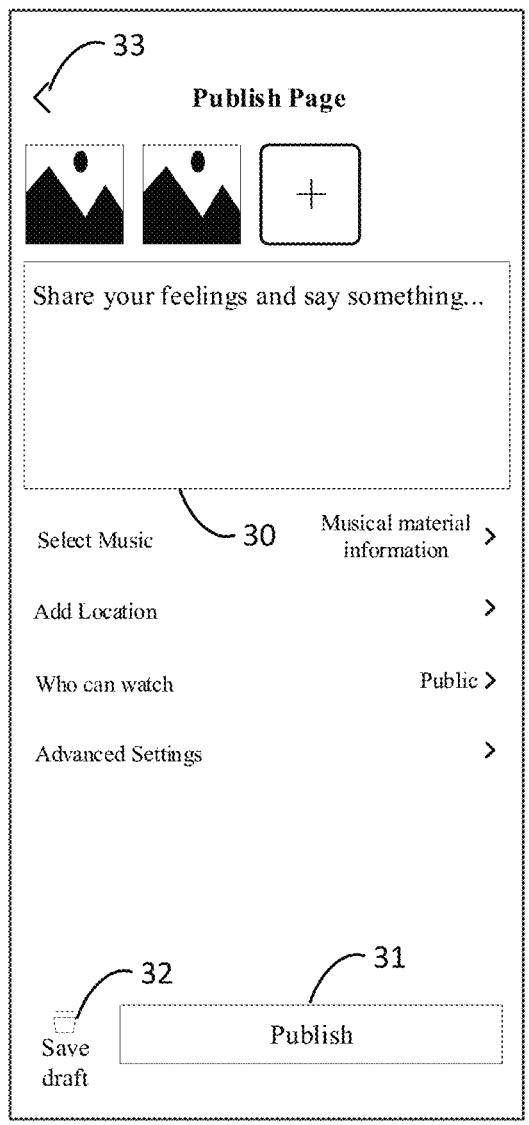
FIG. 4 is a schematic diagram of a display of another publish page provided in an embodiment of the present disclosure.

Illustratively, as shown in FIG. 3, the user may add the target material to the publish page, and may input a copywriting for the target media content in the copywriting input area 30, and/or edit relevant publishing information of the target media content to be published, such as publishing location information, visual status information, whether to add a watermark, whether to allow downloading, and/or topic information of the target media content. When the setting is complete, the user may perform a media content publishing operation, such as triggering a publishing control 31 in the publish page. Accordingly, the electronic device may display material information of the target material added by the user in the publish page as shown in FIG. 4, and upon detecting the media content publishing operation of the user, generate target media content based on the target material added by the user and transmit it to the server for publishing.

In the present embodiment, when the target media content is generated based on the target material added by the user, the type of the generated target media content may be flexibly set, such as the image-text type media content/the video type media content may be generated directly based on the target material without considering the type of the target material added by the user. It is also possible to generate the image-text type media content when the target materials added by the user are all pictures, and generate the video type media content when the target materials added by the user are not completely pictures, such as video type materials, in consideration of the type of the target materials added by the user.

Further, as shown in FIG. 3, a draft box control 32 and/or a return control 33 may also be provided in the publish page. Thus, the user may store the project file corresponding to the target media content into a draft box by triggering the draft box control 32; and/or, switching back to the capture page again by triggering the return control 33.

In an implementation, the method for publishing media content provided by the present embodiment may further include: in response to a material editing operation acting on the target material, switching the currently displayed page from the publish page to an editing page, where the editing page is configured to trigger editing of the target material.

The material editing operation may be an operation for instructing to display an editing page, such as an operation for triggering to publish material information of a target material displayed in a page.

In the above implementation, the currently displayed page may be switched from the publish page to the editing page based on the material editing operation of the user, so that the user edits the target material added by the user.

Figure 5:
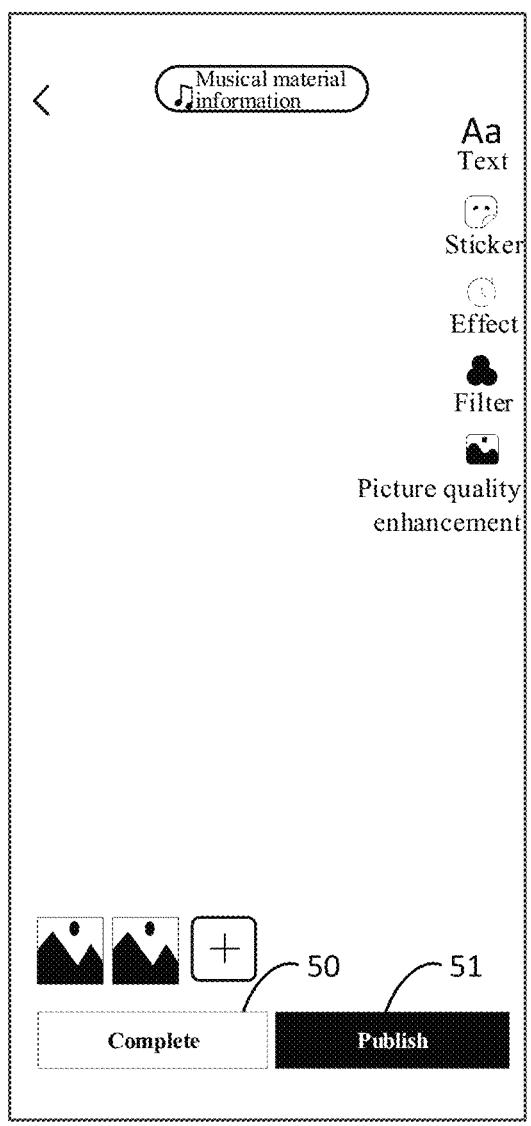
FIG. 5 is a schematic diagram of a display of an editing page provided in an embodiment of the present disclosure.

Illustratively, the user may perform a material editing operation when there is a need to edit the added target material. Accordingly, the electronic device may switch the currently displayed page from the publish page to the editing page when detecting the material editing operation of the user, as illustrated in FIG. 5. Thus, the user may edit the target material in the editing page, such as editing the target content material, adding or deleting a target content material, or adding or replacing a background musical material of the target media content.

Further, with continued reference to FIG. 5, a completion control 50 and a publishing control 51 may also be provided in the editing page. Accordingly, the user may trigger the completion control 50 displayed in the editing page to instruct the electronic device to switch the currently displayed page from the editing page back to the publish page after the editing is completed. Alternatively, triggering the publishing control 51 displayed in the editing page instructs the electronic device to generate and publish the target media content based on the edited target material without switching back to the publish page again to publish the target media content, thereby simplifying the operations required by the user when publishing the media content.

The present embodiment provides a method for publishing media content in response to a publish page display operation acting on a capture page, switching a current display page from the capture page to a publish page, where the publish page is configured to trigger an addition of a target material; and in response to a media content publishing operation, publishing target media content generated based on the target material. The present embodiment can simplify the operation required for publishing media content by the user, shorten the user's authoring path, and improve the user's authoring efficiency by directly switching from the capture page to the publish page and adding the target material to the publish page without first switching to the editing page and then switching from the editing page to the publish page, by adopting the above technical solution.

Figure 6:
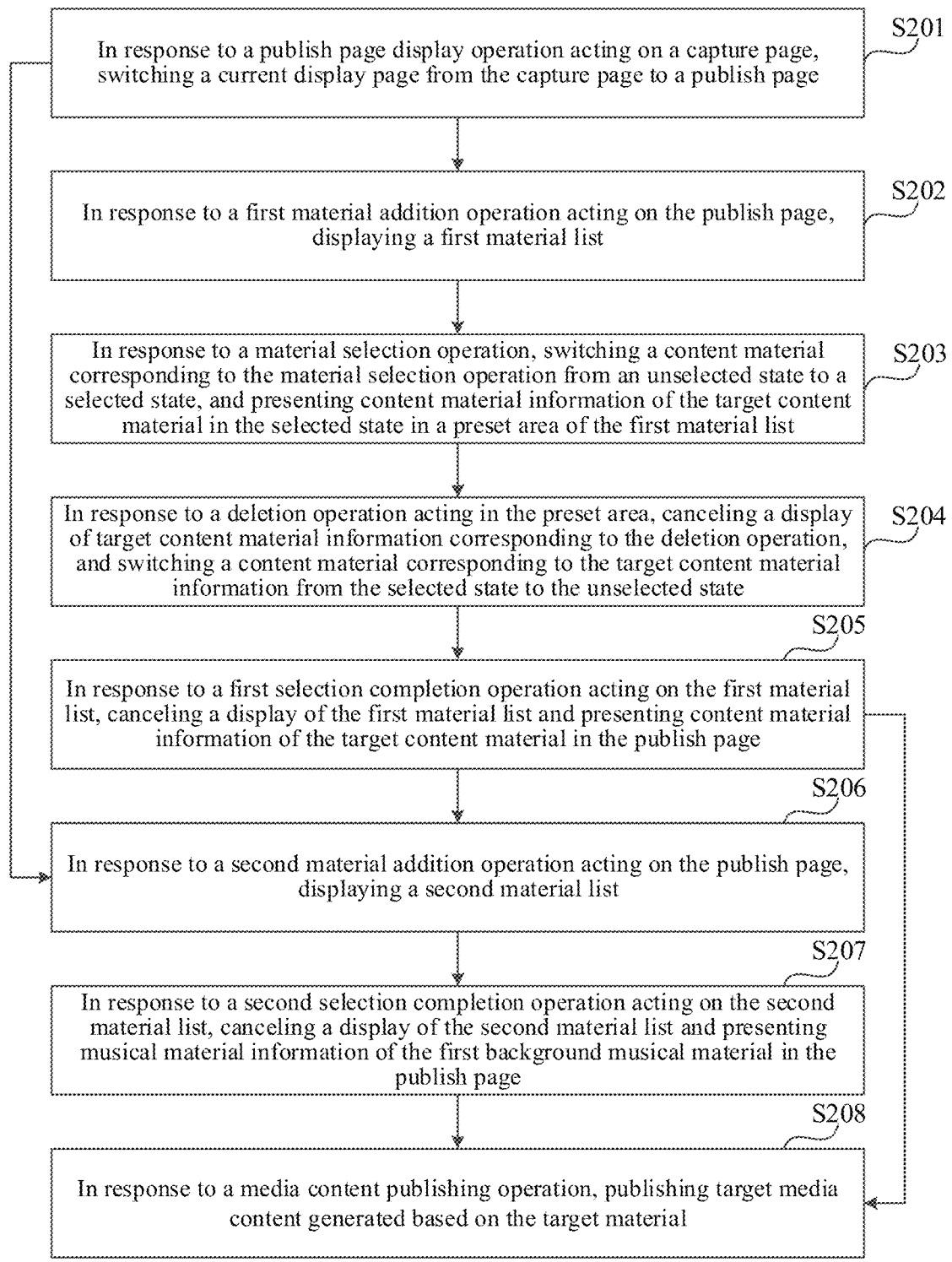
FIG. 6 is a flowchart of another method for publishing media content provided in an embodiment of the present disclosure.

FIG. 6 is a flowchart of another method for publishing media content provided in an embodiment of the present disclosure. The solutions in the present embodiment may be combined with one or more optional solutions in the above embodiments.

Optionally, the target material includes a target content material, and after switching a current display page from the capture page to a publish page, the method further includes: in response to a first material addition operation acting on the publish page, displaying a first material list, the first material list being configured to present a content material to be selected; and in response to a first selection completion operation acting on the first material list, canceling a display of the first material list and presenting content material information of the target content material in the publish page, the target content material being a content material selected by a user in the first material list.

Optionally, after displaying a first material list, the method further includes: in response to a material selection operation, switching a content material corresponding to the material selection operation from an unselected state to a selected state, and presenting content material information of the target content material in the selected state in a preset area of the first material list.

Optionally, after presenting content material information of the target content material in the selected state in a preset area of the first material list, the method further includes: in response to a deletion operation acting in the preset area, canceling a display of target content material information corresponding to the deletion operation, and switching a content material corresponding to the target content material information from the selected state to the unselected state.

Optionally, the target material includes a first background musical material selected by a user, and after switching a current display page from the capture page to a publish page, the method further includes: in response to a second material addition operation acting on the publish page, displaying a second material list, the second material list being configured to present a background musical material to be selected; and in response to a second selection completion operation acting on the second material list, canceling a display of the second material list and presenting musical material information of the first background musical material in the publish page, the first background musical material being a background musical material selected by the user in the second material list.

Accordingly, as shown in FIG. 6, a method for publishing media content provided by the present embodiment may include:

S201, in response to a publish page display operation acting on a capture page, switching a current display page from the capture page to a publish page, performing S202 or S206, where the publish page is configured to trigger an addition of a target material, and the target material includes a target content material and/or a first background musical material selected by a user.

S202, in response to a first material addition operation acting on the publish page, displaying a first material list, the first material list being configured to present a content material to be selected.

The first material addition operation may be understood as an operation that adds a content material, such as an operation that triggers a content material addition control displayed in the publish page. The content material may be understood as a material used to generate the presentation content of the target media content, which may be a video material (i.e., a video-type material) or a picture material (i.e., a picture-type material), or the like. The first material list may be a list for presenting content material available for selection by the user, such as the user's local material list. Taking a scenario of publishing the image-text type media content as an example, the content material may be a picture, and the first material list may be used to present a local picture of the user.

Figure 7:
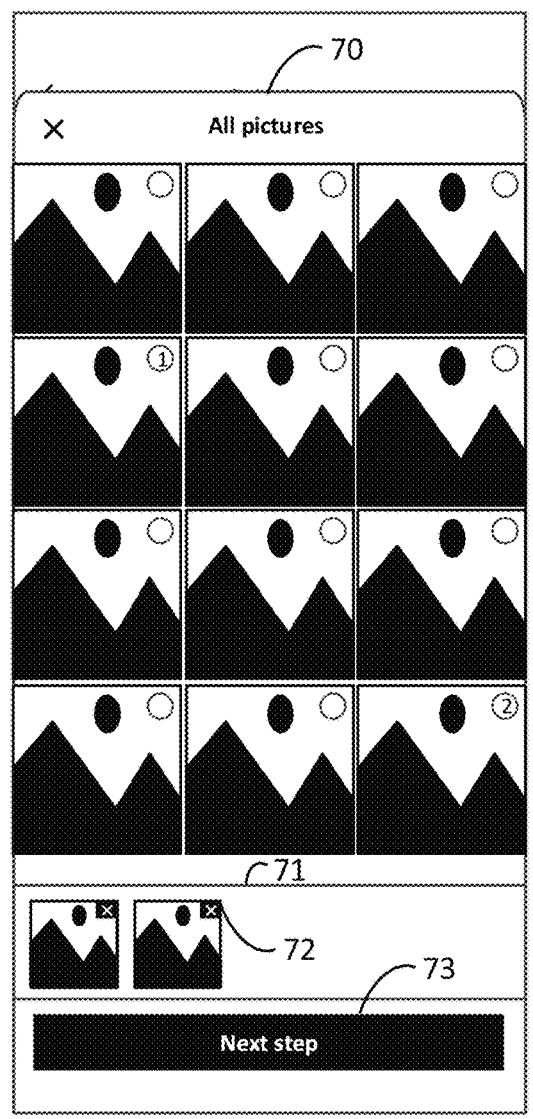
FIG. 7 is a schematic diagram of a first material list provided in an embodiment of the present disclosure.

Illustratively, a user may trigger a content material addition control 34 displayed in the publish page when he or she wishes to add a content material for generating the target media content, as shown in FIG. 3. Accordingly, the electronic device, upon detecting that the user triggers the material addition control 34, displays the first material list 70 and displays in the first material list 70 each content material available for selection by the user that can be used to generate the corresponding type of target media content that the user intends to author, e.g., when the user intends to author the image-text type media content, the picture material may be displayed in and only in the first material list 70, as shown in FIG. 7, for selection by the user.

In the present embodiment, the content material that can be used to generate the target media content that the user intends to author can be presented only in the first material list, so that the user can directly select a material in the first material list, without the user having to filter the types of content materials displayed in the first material list. Compared to switching to the user's local album page and presenting all the local material in the user's local album in the local album page, this can not only shorten the authoring path of the media content, but also can improve the efficiency of selecting the content material, and thus improve the authoring efficiency of the media content.

S203, in response to a material selection operation, switching a content material corresponding to the material selection operation from an unselected state to a selected state, and presenting content material information of the target content material in the selected state in a preset area of the first material list.

The material selection operation may be understood as an operation of selecting a content material, such as an operation of clicking on a content material not in the selected state in the first material list. The target content material may be understood as the content material selected by the user in the first material list, i.e., the content material in the first material list that is in the selected state. The content material information of a content material (e.g., target content material) may be related information of the content material, which may be presented in the form of text or pictures, e.g., the content material information is a thumbnail, e.g., when the content material is a video material, the content material information of the content material may be a thumbnail of the cover of the content material or a thumbnail of a video frame in the content material. When the content material is a picture material, the content material information of the content material may be a thumbnail of the content material.

Illustratively, when a user desires to select a content material in an unselected state, the user may perform a material selection operation for the content material, such as clicking on the content material. Accordingly, the electronic device, upon detecting the material selection operation by the user, may switch the content material corresponding to the material selection operation from the unselected state to the selected state, such as displaying the sequence number of the content material in the result of sorting the target content materials according to the selection order by the user, and incrementally displaying the content material information of the content material in the preset area 71 of the first material list 70, that is, displaying the content material information of each content material in the selected state in the preset area 71 of the first material list 70, as shown in FIG. 7, so that the user can quickly determine the content material that he or she has selected.

S204, in response to a deletion operation acting in the preset area, canceling a display of target content material information corresponding to the deletion operation, and switching a content material corresponding to the target content material information from the selected state to the unselected state.

The deletion operation may be understood as an operation of deleting a content material information displayed in the preset area, such as an operation of triggering a deletion control corresponding to a target content material displayed in the preset area. Accordingly, the target content material information may be the content material information to which the deletion operation is directed.

Illustratively, as shown in FIG. 7, when the content material information of the target content material selected by the user is displayed in the preset area 71, a deletion control 72 corresponding to each target content material may be displayed. Thus, when a user desires to cancel the selection of a target content material, the user may trigger the deletion control 72 displayed in the preset area 71 corresponding to the target content material. Accordingly, the electronic device, upon detecting that the user triggers the deletion control 72 corresponding to a target content material displayed in the preset area 71, may delete the content material information of the target content material from the preset area 71 and switch the target content material from the selected state to the unselected state.

In the present embodiment, by displaying each content material that the user has selected and the deletion control corresponding to each content material that the user has selected in the preset area of the first material list, the operation required for the user to view or unselect the content material that the user has selected can be simplified by eliminating the need for the user to view or unselect the content material that the user has selected by browsing the first material list, thereby improving the efficiency of selecting the content material.

S205, in response to a first selection completion operation acting on the first material list, canceling a display of the first material list and presenting content material information of the target content material in the publish page, performing S206 or S208, where the target content material is a content material selected by a user in the first material list.

The first selection completion operation may be understood as an operation that confirms that the target content material has been selected to be completed, such as an operation that triggers the next step control displayed in the first material list.

Illustratively, the user may trigger the next step control 73 displayed in the first material list 70 after the user has completed selecting the target content material to be added, as shown in FIG. 7. Accordingly, the electronic device, upon detecting that the user triggers the next step control 73 in the first material list 70, may determine that the first selection completion operation is received, and in response to the first selection completion operation, stop displaying the first material list 70 and display content material information of the target content material selected by the user in the publish page, as shown in FIG. 4.

S206, in response to a second material addition operation acting on the publish page, displaying a second material list, the second material list being configured to present a background musical material to be selected.

A second material addition operation may be understood as an operation to add a background musical material, such as an operation to trigger a music selection control displayed in a publish page. The background musical material may be understood as a material used as background music of the target media content. The second material list may be a list for presenting a background musical material available for selection by the user.

Illustratively, the user may trigger a music selection control 35 displayed in the publish page when he or she wishes to add a background musical material, as shown in FIG. 3. Accordingly, the electronic device, upon detecting that the user triggers the music selection control 35, may display a second material list and display each background musical material to be selected in the second material list for selection by the user.

S207, in response to a second selection completion operation acting on the second material list, canceling a display of the second material list and presenting musical material information of the first background musical material in the publish page, the first background musical material being a background musical material selected by the user in the second material list.

The second selection completion operation may be understood as an operation for confirming that the background musical material has been selected to be completed. The first background musical material may be understood as the background musical material selected by the user in the second material list. The musical material information of a background musical material may be related information of the background musical material, such as the name and/or singer information of the background musical material.

Illustratively, the user may perform a second selection completion operation after completing the selection of the first background musical material to be added by the user. Accordingly, the electronic device, upon detecting the second selection completion operation by the user, may stop displaying the second material list and display the musical material information of the first background musical material selected by the user in the publish page in response to the second selection completion operation, as shown in FIG. 4.

In the present embodiment, when the background musical material is not selected by the user, a recommended background musical material may also be adopted as the background musical material of the target media content to be generated. For example, the recommended background musical material may be determined when switching from the capture page to the publish page, or, after the user selects the target content material, the recommended background musical material may be determined based on the target content material selected by the user, and musical material information of the recommended background musical material is displayed in the publish page. Thereby, if the user selects the first background musical material, the first background musical material is used as the background musical material of the target media content, and the musical material information displayed in the publish page is updated to the musical material information of the first background musical material. If the user does not select the first background musical material, the recommended background musical material is used as the background musical material of the target media content. At this time, optionally, the target material includes a second background musical material as recommended, and switching a current display page from the capture page to a publish page includes switching the current display page from the capture page to the publish page, and presenting musical material information of a second background musical material in the publish page. The second background musical material may be understood as the recommended background musical material.

S208, in response to a media content publishing operation, publishing target media content generated based on the target material.

In the present embodiment, when the target media content is the image-text type media content, the introduction information of the target media content generated based on the target material may be a copywriting input by a user, and the content of the target media content may be target content material, i.e., each target content material may be automatically switched for presentation when the target media content is presented.

The present embodiment provides a method for publishing media content in which a user can complete selection of a target material in a publish page and publish the target media content generated based on the target material selected by the user in the publish page, i.e., the user can complete authoring of the media content in the publish page, which can simplify operations required for authoring the media content by the user, and improve the efficiency of authoring the media content.

Figure 8:
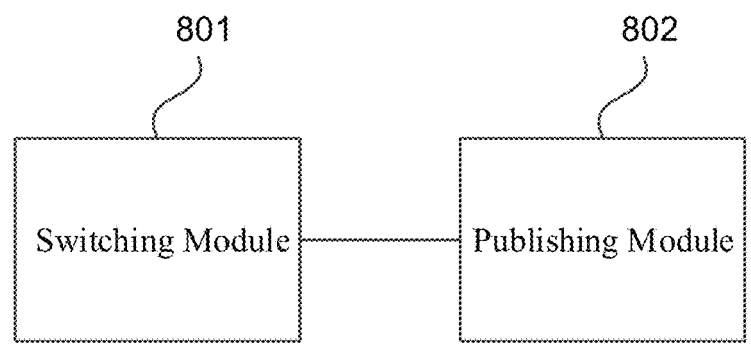
FIG. 8 is a structural block diagram of an apparatus for publishing media content provided in an embodiment of the present disclosure.

FIG. 8 is a structural block diagram of an apparatus for publishing media content provided in an embodiment of the present disclosure. The apparatus may be implemented by software and/or hardware, and may be configured in an electronic device, for example, a mobile phone or a tablet computer, and may publish media content by executing a method for publishing media content. As shown in FIG. 8, the apparatus for publishing media content provided by the present embodiment may include a switching module 801 and a publishing module 802.

The switching module 801 is configured to, in response to a publish page display operation acting on a capture page, switch a current display page from the capture page to a publish page, where the publish page is configured to trigger an addition of a target material.

The publishing module 802 is configured to, in response to a media content publishing operation, publish target media content generated based on the target material.

The present embodiment provides an apparatus for publishing media content, in response to a publish page display operation acting on a capture page, switching a current display page from the capture page to a publish page by the switching module, where the publish page is configured to trigger an addition of a target material; and in response to a media content publishing operation, publishing target media content generated based on the target material by the publishing module. The present embodiment can simplify the operation required for publishing media content by the user, shorten the user's authoring path, and improve the user's authoring efficiency by directly switching from the capture page to the publish page and adding the target material to the publish page without first switching to the editing page and then switching from the editing page to the publish page, by adopting the above technical solution.

In the above solution, the target material may include a target content material, and the apparatus for publishing media content provided by the present embodiment may further include: a first list display module configured to, after switching the current display page from the capture page to the publish page, in response to a first material addition operation acting on the publish page, display a first material list, where the first material list is configured to present a content material to be selected; and a first information presentation module configured to, in response to a first selection completion operation acting on the first material list, cancel the display of the first material list and present content material information of the target content material in the publish page, where the target content material is a content material selected by a user in the first material list.

In an embodiment, the apparatus for publishing media content provided by the present embodiment may further include: a state switching module configured to, after displaying the first material list, in response to the material selection operation, switch a content material corresponding to a material selection operation from an unselected state to a selected state and present content material information of the target content material in the selected state in a preset area of the first material list.

In an embodiment, the apparatus for publishing media content provided by the present embodiment may further include an information deletion module configured to, after presenting content material information of the target content material in the selected state in a preset area of the first material list, in response to a deletion operation acting in the preset area, cancel a display of target content material information corresponding to the deletion operation, and switch a content material corresponding to the target content material information from the selected state to the unselected state.

In the above solutions, the content material may be a picture, and the content material information may be a thumbnail.

In the above solutions, the target material may include a first background musical material selected by a user, and the apparatus for publishing media content according to the present embodiment may further include: a second list display module configured to, after switching a current display page from the capture page to a publish page, in response to a second material addition operation acting on the publish page, display a second material list, where the second material list is configured to present a background musical material to be selected; and a second information presentation module configured to, in response to a second selection completion operation acting on the second material list, cancel a display of the second material list and presenting musical material information of the first background musical material in the publish page, where the first background musical material is a background musical material selected by the user in the second material list.

In the above solutions, the target material may include a second background musical material as recommended, and the switching module 801 may be configured to present the musical material information of the second background musical material in the publish page by switching the current display page from the capture page to the publish page, and presenting musical material information of a second background musical material in the publish page.

In an embodiment, the apparatus for publishing media content provided by the present embodiment may further include an editing page display module configured to, in response to a material editing operation acting on the target material, switch the currently displayed page from the publish page to an editing page, where the editing page is configured to trigger editing of the target material.

The apparatus for publishing media content provided by the embodiments of the present disclosure may perform the method for publishing media content provided by any of the embodiments of the present disclosure, and has corresponding functional modules and beneficial effects to perform the method for publishing media content. Technical details, which are not described in detail in this embodiment, may be referred to the method for publishing media content provided by any embodiment of the present disclosure.

Figure 9:
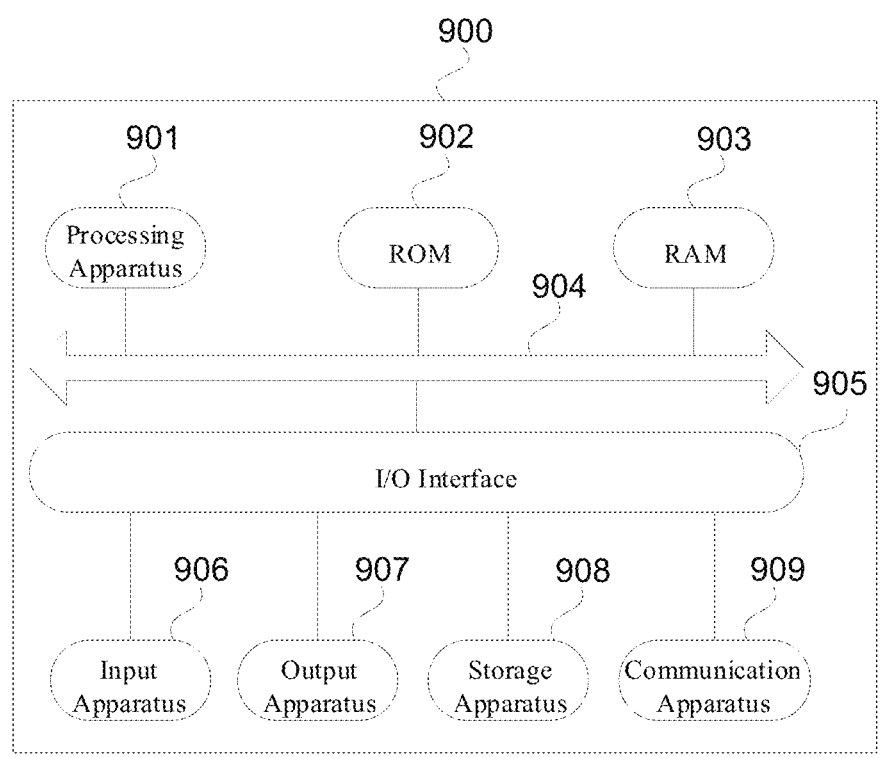
FIG. 9 is a structural schematic diagram of an electronic device provided in an embodiment of the present disclosure.

FIG. 9 is specifically referred below, and it shows the structural schematic diagram suitable for achieving the electronic device (e.g. terminal device) 900 in the embodiment of the present disclosure. The terminal device in the embodiment of the present disclosure may include a mobile terminal such as a mobile phone, a notebook computer, a digital broadcasting receiver, a personal digital assistant (PDA), a portable android device (PAD), a portable multimedia player (PMP), a vehicle terminal (such as a vehicle navigation terminal), and a fixed terminal such as a digital television (TV) and a desktop computer. The electronic device 900 shown in FIG. 9 is only an example.

As shown in FIG. 9, the electronic device 900 may include a processing apparatus (such as a central processing unit, and a graphics processor) 901, the processing apparatus 901 may execute a plurality of appropriate actions and processes according to a program stored in a read-only memory (ROM) 902 or a program loaded from a storage apparatus 908 to a random-access memory (RAM) 903. In RAM 903, a plurality of programs and data required for operations of the electronic device 900 are also stored. The processing apparatus 901, ROM 902, and RAM 903 are connected to each other by a bus 904. An input/output (I/O) interface 905 is also connected to the bus 904.

Typically, the following apparatuses may be connected to the I/O interface 905: an input apparatus 906 such as a touch screen, a touchpad, a keyboard, a mouse, a camera, a microphone, an accelerometer, and a gyroscope; an output apparatus 907 such as a liquid crystal display (LCD), a loudspeaker, and a vibrator; a storage apparatus 908 such as a magnetic tape, and a hard disk drive; and a communication apparatus 909. The communication apparatus 909 may allow the electronic device 900 to wireless-communicate or wire-communicate with other devices so as to exchange data. Although FIG. 9 shows the electronic device 900 with a plurality of apparatuses, it is not required to implement or possess all the apparatuses shown. Alternatively, it may implement or possess the more or less apparatuses.

In an embodiment, according to the embodiment of the present disclosure, the process described above with reference to the flowchart may be achieved as a computer software program. For example, an embodiment of the present disclosure includes a computer program product, it includes a computer program carried on a non-transitory computer-readable medium, and the computer program includes program codes for executing the method shown in the flowchart. In such an embodiment, the computer program may be downloaded and installed from the network by the communication apparatus 909, or installed from the storage apparatus 908, or installed from ROM 902. When the computer program is executed by the processing apparatus 901, the above functions defined in the method in the embodiments of the present disclosure are executed.

It should be noted that the above computer-readable medium in the present disclosure may be a computer-readable signal medium, a computer-readable storage medium, or combinations of the two. The computer-readable storage medium may be, for example, a system, an apparatus or a device of electricity, magnetism, light, electromagnetism, infrared, or semiconductor, or combinations of the above. More examples of the computer-readable storage medium may include: an electric connector with at least one wire, a portable computer magnetic disk, a hard disk drive, a RAM, a ROM, an erasable programmable read-only memory (e.g. an electronic programable read only memory (EPROM) or a flash memory), an optical fiber, a compact disk read-only memory (CD-ROM), an optical storage device, a magnetic storage device or suitable combinations of the above. In the present disclosure, the computer-readable storage medium may be visible medium that contains or stores a program, and the program may be used by an instruction executive system, apparatus or device or used in combination with it. In the present disclosure, the computer-readable signal medium may include a data signal propagated in a baseband or as a part of a carrier wave, it carries the computer-readable program code. The data signal propagated in this way may adopt a plurality of forms, including an electromagnetic signal, an optical signal, or suitable combinations of the above. The computer-readable signal medium may also be any computer-readable medium other than the computer-readable storage medium, and the computer-readable signal medium may send, propagate, or transmit the program used by the instruction executive system, apparatus or device or in combination with it. The program code contained on the computer-readable medium may be transmitted by using any suitable medium, including: a wire, an optical cable, a radio frequency (RF) or the like, or suitable combinations of the above.

In some implementations, the client and the server may communicate with a network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as a network currently known or to be researched and developed in the future.

The above-mentioned computer-readable medium may be included in the electronic device described above, or may exist alone without being assembled into the electronic device.

The above-mentioned computer-readable medium carries at least one program which, when executed by the electronic device, cause the electronic device to: in response to a publish page display operation acting on a capture page, switch a current display page from the capture page to a publish page, where the publish page is configured to trigger an addition of a target material; and in response to a media content publishing operation, publish target media content generated based on the target material.

The computer program code for executing the operation of the present disclosure may be written in one or more programming languages or combinations thereof, the above programming language includes object-oriented programming languages such as Java, Smalltalk, and C++, and also includes conventional procedural programming languages such as a "C" language or a similar programming language. The program code may be completely executed on the user's computer, partially executed on the user's computer, executed as a standalone software package, partially executed on the user's computer and partially executed on a remote computer, or completely executed on the remote computer or server. In the case involving the remote computer, the remote computer may be connected to the user's computer by any types of networks, including LAN or WAN, or may be connected to an external computer (such as connected by using an internet service provider through the Internet).

The flowcharts and the block diagrams in the drawings show possibly achieved system architectures, functions, and operations of systems, methods, and computer program products according to a plurality of embodiments of the present disclosure. At this point, each box in the flowchart or the block diagram may represent a module, a program segment, or a part of a code, the module, the program segment, or a part of the code contains at least one executable instruction for achieving the specified logical functions. It should also be noted that in some alternative implementations, the function indicated in the box may also occur in a different order from those indicated in the drawings. For example, two consecutively represented boxes may actually be executed basically in parallel, and sometimes it may also be executed in an opposite order, this depends on the function involved. It should also be noted that each box in the block diagram and/or the flowchart, as well as combinations of the boxes in the block diagram and/or the flowchart, may be achieved by using a dedicated hardware-based system that performs the specified function or operation, or may be achieved by using combinations of dedicated hardware and computer instructions.

The involved units described in the embodiments of the present disclosure may be achieved by a mode of software, or may be achieved by a mode of hardware. The name of the unit does not constitute a limitation for the unit itself in a case.

The functions described above in this article may be at least partially executed by at least one hardware logic component. For example, exemplary types of the hardware logic component that may be used include: a field programmable gate array (FPGA), an application specific integrated circuit (ASIC), an application specific standard part (ASSP), a system on chip (SOC), a complex programmable logic device (CPLD) and the like.

In the context of the present disclosure, the machine-readable medium may be a visible medium, and it may contain or store a program for use by or in combination with an instruction executive system, apparatus, or device. The machine-readable medium may be a machine-readable signal medium or a machine-readable storage medium. The machine-readable medium may include an electronic, magnetic, optical, electromagnetic, infrared, or semiconductor system, apparatus, or device, or suitable combinations of the above. More specific examples of the machine-readable storage medium may include an electric connector based on at least one wire, a portable computer disk, a hard disk drive, RAM, ROM, EPROM (or a flash memory), an optical fiber, CD-ROM, an optical storage device, a magnetic storage device, or suitable combinations of the above.

According to one or more embodiments of the present disclosure, Example 1 provides a method for publishing media content, including:

in response to a publish page display operation acting on a capture page, switching a current display page from the capture page to a publish page, the publish page being configured to trigger an addition of a target material; and in response to a media content publishing operation, publishing target media content generated based on the target material.

According to one or more embodiments of the present disclosure, Example 2 provides the method according to Example 1, the target material includes a target content material, after the switching a current display page from the capture page to a publish page, the method further includes:

in response to a first material addition operation acting on the publish page, displaying a first material list, the first material list being configured to present a content material to be selected; and in response to a first selection completion operation acting on the first material list, canceling a display of the first material list and presenting content material information of the target content material in the publish page, the target content material being a content material selected by a user in the first material list.

According to one or more embodiments of the present disclosure, Example 3 provides the method according to Example 2, the displaying a first material list, the method further including:

in response to a material selection operation, switching a content material corresponding to the material selection operation from an unselected state to a selected state, and presenting content material information of the target content material in the selected state in a preset area of the first material list.

According to one or more embodiments of the present disclosure, Example 4 provides the method according to Example 3, after the presenting content material information of the target content material in the selected state in a preset area of the first material list, the method further including:
in response to a deletion operation acting in the preset area, canceling a display of target content material information corresponding to the deletion operation, and switching a content material corresponding to the target content material information from the selected state to the unselected state.

According to one or more embodiments of the present disclosure, Example 5 provides the method according to Example 2, the content material is a picture and the content material information is a thumbnail.

According to one or more embodiments of the present disclosure, Example 6 provides the method according to Example 1, the target material includes a first background musical material selected by a user, after the switching a current display page from the capture page to a publish page, the method further includes:
in response to a second material addition operation acting on the publish page, displaying a second material list, the second material list being configured to present a background musical material to be selected; and
in response to a second selection completion operation acting on the second material list, canceling a display of the second material list and presenting musical material information of the first background musical material in the publish page, the first background musical material being a background musical material selected by the user in the second material list.

According to one or more embodiments of the present disclosure, Example 7 provides the method according to Example 1, the target material includes a second background musical material as recommended, and the switching a current display page from the capture page to a publish page includes:
switching the current display page from the capture page to the publish page, and presenting musical material information of a second background musical material in the publish page.

According to one or more embodiments of the present disclosure, Example 8 provides the method according to any one of Examples 1-7, further including:
in response to a material editing operation acting on the target material, switching the currently displayed page from the publish page to an editing page, the editing page being configured to trigger editing of the target material.

According to one or more embodiments of the present disclosure, Example 9 provides an apparatus for publishing media content, including:
a switching module, configured to, in response to a publish page display operation acting on a capture page, switch a current display page from the capture page to a publish page, the publish page being configured to trigger an addition of a target material; and
a publishing module, configured to, in response to a media content publishing operation, publish target media content generated based on the target material.

According to one or more embodiments of the present disclosure, Example 10 provides
an electronic device, including:
a processor; and
a memory configured to store programs,
upon the programs being executed by the processor, the processor implementing the method for publishing media content according to any one of Examples 1-8.

According to one or more embodiments of the present disclosure, Example 11 provides a computer-readable storage medium storing computer instructions, where the computer instructions upon being executed by a processor, implement the method for publishing media content according to any one of Examples 1-8.

According to one or more embodiments of the present disclosure, Example 12 provides a computer program product that, when executed by a computer, implements the method for publishing media content according to any one of Examples 1-8.

The invention claimed is:

1. A method for publishing media content, comprising:
in response to a publish page display operation acting on a capture page, directly switching a current display page from the capture page to a publish page without switching to an editing page, wherein the publish page is configured to trigger an addition of a target material; and
in response to a media content publishing operation, publishing target media content generated based on the target material,
wherein the target material comprises a target content material, after the switching a current display page from the capture page to a publish page, the method further comprises;
in response to a first material addition operation acting on the publish page, displaying a first material list, wherein the first material list is configured to present a content material to be selected; and
in response to a first selection completion operation acting on the first material list, canceling a display of the first material list and presenting content material information of the target content material in the publish page, wherein the target content material is a content material selected by a user in the first material list,
wherein after the displaying a first material list, the method further comprising:
in response to a material selection operation, switching a content material corresponding to the material selection operation from an unselected state to a selected state, and presenting content material information of the target content material in the selected state in a preset area of the first material list.

2. The method of claim 1, after the presenting content material information of the target content material in the selected state in a preset area of the first material list, the method further comprising:
in response to a deletion operation acting in the preset area, canceling a display of target content material information corresponding to the deletion operation, and switching a content material corresponding to the target content material information from the selected state to the unselected state.

3. The method of claim 1, wherein the content material is a picture and the content material information is a thumbnail.

4. The method of claim 1, wherein the target material comprises a first background musical material selected by a user, after the switching a current display page from the capture page to a publish page, the method further comprises:

in response to a second material addition operation acting on the publish page, displaying a second material list, wherein the second material list is configured to present a background musical material to be selected; and in response to a second selection completion operation acting on the second material list, canceling a display of the second material list and presenting musical material information of the first background musical material in the publish page, wherein the first background musical material is a background musical material selected by the user in the second material list.

5. The method of claim 1, wherein the target material comprises a second background musical material as recommended, and the switching a current display page from the capture page to a publish page comprises:

switching the current display page from the capture page to the publish page, and presenting musical material information of a second background musical material in the publish page.

6. The method of claim 1, further comprising:

in response to a material editing operation acting on the target material, switching the currently displayed page from the publish page to an editing page, wherein the editing page is configured to trigger editing of the target material.

7. An electronic device, comprising:

at least one processor; and at least one memory communicatively connected with the at least one processor, wherein the at least one memory stores computer programs executable by the at least one processor, and upon the computer programs being executed by the at least one processor, the at least one processor is capable of performing implements a method for publishing media content, and the method comprises:

in response to a publish page display operation acting on a capture page, directly switching a current display page from the capture page to a publish page without switching to an editing page, wherein the publish page is configured to trigger an addition of a target material; and in response to a media content publishing operation, publishing target media content generated based on the target material, wherein the target material comprises a target content material, after the switching a current display page from the capture page to a publish page, the method further comprises:

in response to a first material addition operation acting on the publish page, displaying a first material list, wherein the first material list is configured to present a content material to be selected; and in response to a first selection completion operation acting on the first material list, canceling a display of the first material list and presenting content material information of the target content material in the publish page, wherein the target content material is a content material selected by a user in the first material list, wherein after the displaying a first material list, the method further comprising;

in response to a material selection operation, switching a content material corresponding to the material selection operation from an unselected state to a selected state, and presenting content material information of the target content material in the selected state in a preset area of the first material list.

8. The electronic device of claim 7, after the presenting content material information of the target content material in the selected state in a preset area of the first material list, the method further comprising:

in response to a deletion operation acting in the preset area, canceling a display of target content material information corresponding to the deletion operation, and switching a content material corresponding to the target content material information from the selected state to the unselected state.

9. The electronic device of claim 7, wherein the content material is a picture and the content material information is a thumbnail.

10. The electronic device of claim 7, wherein the target material comprises a first background musical material selected by a user, after the switching a current display page from the capture page to a publish page, the method further comprises:

in response to a second material addition operation acting on the publish page, displaying a second material list, wherein the second material list is configured to present a background musical material to be selected; and in response to a second selection completion operation acting on the second material list, canceling a display of the second material list and presenting musical material information of the first background musical material in the publish page, wherein the first background musical material is a background musical material selected by the user in the second material list.

11. The electronic device of claim 7, wherein the target material comprises a second background musical material as recommended, and the switching a current display page from the capture page to a publish page comprises:

switching the current display page from the capture page to the publish page, and presenting musical material information of a second background musical material in the publish page.

12. The electronic device of claim 7, wherein the method further comprises:

in response to a material editing operation acting on the target material, switching the currently displayed page from the publish page to an editing page, wherein the editing page is configured to trigger editing of the target material.

13. A non-transient computer-readable storage medium, storing computer instructions, wherein the computer instructions upon being executed by a processor, implement a method for publishing media content, and the method comprises:

in response to a publish page display operation acting on a capture page, directly switching a current display page from the capture page to a publish page without switching to an editing page, wherein the publish page is configured to trigger an addition of a target material; and in response to a media content publishing operation, publishing target media content generated based on the target material, wherein the target material comprises a target content material, after the switching a current display page from the capture page to a publish page, the method further comprises:

in response to a first material addition operation acting on the publish page, displaying a first material list, wherein the first material list is configured to present a content material to be selected; and in response to a first selection completion operation acting on the first material list, canceling a display of the first material list and presenting content material information of the target content material in the publish page, wherein the target content material is a content material selected by a user in the first material list, wherein after the displaying a first material list, the method further comprising:

in response to a material selection operation, switching a content material corresponding to the material selection operation from an unselected state to a selected state, and presenting content material information of the target content material in the selected state in a preset area of the first material list.

14. The non-transient computer-readable storage medium of claim 13, after the presenting content material information of the target content material in the selected state in a preset area of the first material list, the method further comprising:

in response to a deletion operation acting in the preset area, canceling a display of target content material information corresponding to the deletion operation, and switching a content material corresponding to the target content material information from the selected state to the unselected state.

15. The non-transient computer-readable storage medium of claim 13, wherein the content material is a picture and the content material information is a thumbnail.

16. The non-transient computer-readable storage medium of claim 13, wherein the target material comprises a first background musical material selected by a user, after the switching a current display page from the capture page to a publish page, the method further comprises:

in response to a second material addition operation acting on the publish page, displaying a second material list, wherein the second material list is configured to present a background musical material to be selected; and in response to a second selection completion operation acting on the second material list, canceling a display of the second material list and presenting musical material information of the first background musical material in the publish page, wherein the first background musical material is a background musical material selected by the user in the second material list.

17. The non-transient computer-readable storage medium of claim 13, wherein the target material comprises a second background musical material as recommended, and the switching a current display page from the capture page to a publish page comprises:

switching the current display page from the capture page to the publish page, and presenting musical material information of a second background musical material in the publish page.

18. The non-transient computer-readable storage medium of claim 13, further comprising:

in response to a material editing operation acting on the target material, switching the currently displayed page from the publish page to an editing page, wherein the editing page is configured to trigger editing of the target material.

* * * * *